US008330759B1

(12) United States Patent  
Besbeas et al.

(10) Patent No.: US 8,330,759 B1  
(45) Date of Patent: Dec. 11, 2012

(54) DEFINING ONE OR MORE USED SEGMENTS BASED UPON EXTENT OF COMPLETION OF A PROCESS

(75) Inventors: Nick Besbeas, Redmond, WA (US); Bassel Ojjeh, Bellevue, WA (US); Basem Nayfeh, Mercer Island, WA (US); Bill Gossman, Sammamish, WA (US)

(73) Assignee: AudienceScience Inc., Bellevue, WA (US)

( * ) Notice: Subject to any disclaimer, the term of this patent is extended or adjusted under 35 U.S.C. 154(b) by 0 days.

(21) Appl. No.: 12/883,089

(22) Filed: Sep. 15, 2010
(Under 37 CFR 1.47)

Related U.S. Application Data

(63) Continuation of application No. 11/170,841, filed on Jun. 30, 2005, now abandoned.

(51) Int. Cl.
*G06T 11/20* (2006.01)

(52) U.S. Cl. .............. 345/440; 705/1.1; 705/2; 705/5; 705/7.11; 705/26.1; 709/203; 715/762

(58) Field of Classification Search .............. None
See application file for complete search history.

(56) References Cited

U.S. PATENT DOCUMENTS 5,960,411 A    9/1999  Hartman et al.
6,115,709 A    9/2000  Gilmour et al.
6,665,648 B2  12/2003  Brodersen et al.
6,785,666 B1   8/2004  Nareddy et al.
7,013,285 B1   3/2006  Rebane
7,023,440 B1   4/2006  Havekost et al.
7,117,193 B1  10/2006  Basko et al.
7,225,249 B1   5/2007  Barry et al.
7,464,122 B1  12/2008  Basko et al.

OTHER PUBLICATIONS

Personify, Inc., "Product Demo," 2 pages, 2000.
Personify, Inc., "Shopping Cart Abandonment Accelerator 2.5," 2 pages, no date, 2000.
Personify, Inc., "Solutions: Accelerators™," 2 pages, 2000.
Symantec Corporation, "ACT!2000 Demo," 8 pages, Jul. 5, 2000.
Symantec Corporation, "ACT!2000 User's Guide," Chapter 12—Producing Reports, Chapter 13—Managing and Forecasting Sales, 11 pages, Aug. 1999.

*Primary Examiner* — Antonio A Caschera
(74) *Attorney, Agent, or Firm* — Perkins Coie LLP

(57) ABSTRACT

A facility for delivering a user segment displays an ordered set of steps making up a process, and receives user input selecting one of the displayed steps of the process. In response to receiving the user input, the facility creates a new user segment definition. The created user segment definition establishes a segment to include those users that complete the displayed process through the selected step.

15 Claims, 21 Drawing Sheets

| Week | Visits | Unique Visitors | Steps Completed by Visitors | | | | | | | | |
|---|---|---|---|---|---|---|---|---|---|---|---|
| | | | View Product | | Add to Basket | | Order Shipping | | Payment Made | | Order Confirmed |
| 6 | 12029 | 11967 | 5922 | 49.49% | 2805 | 47.37% | 1368 | 48.77% | 669 | 48.9% | 169 | 25.26% |
| 7 | 20580 | 20496 | 10257 | 50.04% | 4866 | 47.44% | 2331 | 47.9% | 1182 | 50.71 | 288 | 24.37% |
| 8 | 20853 | 20767 | 10429 | 50.22% | 4992 | 47.87% | 2384 | 47.76% | 1206 | 50.59% | 299 | 24.79% |
| 9 | 25932 | 25844 | 11630 | 45% | 4977 | 42.79% | 2392 | 48.06% | 1165 | 48.7% | 274 | 23.52% |
| 10 | 26074 | 25976 | 11640 | 44.81% | 4912 | 42.2% | 2359 | 48.03% | 1174 | 49.77% | 284 | 24.19% |
| 11 | 25781 | 25697 | 11553 | 44.96% | 4898 | 42.4% | 2369 | 48.37% | 1123 | 47.4% | 275 | 24.49% |
| 12 | 31120 | 31017 | 12866 | 41.48% | 4882 | 37.94% | 2354 | 48.22% | 1140 | 48.43% | 291 | 25.53% |
| 13 | 31133 | 31039 | 12952 | 41.73% | 4995 | 38.57% | 2333 | 46.71% | 1198 | 51.35% | 294 | 24.54% |
| 14 | 25157 | 25085 | 10596 | 42.24% | 4194 | 39.58% | 1973 | 47.04% | 1018 | 51.6% | 269 | 26.42% |
| 6-14 | 218659 | 217888 | 97845 | 44.90% | 41521 | 42.43% | 19863 | 47.83% | 9875 | 49.71% | 2443 | 24.73% |

DEFINING ONE OR MORE USED SEGMENTS BASED UPON EXTENT OF COMPLETION OF A PROCESS

CROSS-REFERENCE TO RELATED APPLICATION(S)

This application is a continuation application of U.S. patent application Ser. No. 11/170,841, filed Jun. 30, 2005, which is a continuation application of U.S. patent application Ser. No. 11/134,245, filed May 20, 2005, which is a continuation-in-part of U.S. patent application Ser. No. 10/674,630, entitled "REPORT DEPICTING EXTENT OF COMPLETION OF A PROCESS," filed on Sep. 29, 2003, which is a divisional application of U.S. patent application Ser. No. 09/750,194 entitled "REPORT DEPICTING EXTENT OF COMPLETION OF A PROCESS," filed on Dec. 21, 2000, which application is a continuation of U.S. patent application Ser. No. 09/742,685 entitled "REPORT DEPICTING EXTENT OF COMPLETION OF A PROCESS," filed on Dec. 20, 2000, all of which applications are hereby incorporated by reference in their entireties.

TECHNICAL FIELD

The present invention is directed to the field of data reporting, and, more particularly, to the field of process data reporting.

BACKGROUND

The World Wide Web ("the Web") provides a forum for obtaining information and engaging in commercial transactions. In order to provide information and/or solicit commercial transaction via the Web, a company or other Web publisher establishes a Web site. In order to establish a Web site, the publisher typically connects its own server computer system to the Internet, or secures the use of a server computer system already connected to the Internet. This server executes a Web server program to deliver Web pages and associated data to users via the Internet in response to their requests. Users make such requests using client computer systems, which are generally connected to the Internet via an Internet Service Provider ("ISP").

On some Web sites, there are key processes whose completion by users is valuable to the publisher of the Web site. Such processes comprise a sequence of user actions that, if completed, satisfy an objective of the publisher's. For example, for merchant Web sites that sell products, the process of viewing information about a product, adding the product to a shopping basket, following a "check out" link, providing address information, providing shipping information, and confirming the transaction may constitute a key process, as it is the sequence of user actions that must be performed in order to make a sale and collect revenue. Similarly, for auction Web sites that conduct auctions, the processes of launching an auction and bidding on an auction may be key processes. Because of the importance placed on the objective by the publisher, the publisher has an interest in maximizing the number of users that complete the process to attain the objective. Accordingly, it would be useful if a publisher could easily determine how many users are completing a key process, and identify any steps in the process at which a significant percentage of users discontinue the process.

Unfortunately, no effective tools exist for analyzing and intuitively displaying the extent of user completion of key processes on a Web site. Accordingly, a facility for analyzing and intuitively displaying the extent of user completion of key processes on a Web site would have significant utility.

BRIEF DESCRIPTION OF THE DRAWINGS

FIG. 4A is a display diagram showing the initial state of the funnel definition user interface.

FIG. 4B is a display diagram showing the selection of the first stage of the funnel.

FIG. 4C is a display diagram showing the selection of an event type for the second stage of the funnel.

FIG. 4D is a display diagram showing the selection of an event type for the third stage of the funnel.

FIG. 4E is a display diagram showing the selection of an event type for the fourth stage of the funnel.

FIG. 4F is a display diagram showing the selection of an event type for the fifth stage of the funnel.

FIG. 4G is a display diagram showing the selection of an event type for the sixth stage of the funnel.

FIG. 5 is a data structure diagram showing data preferably accessed by the facility in the data warehouse in order to display the defined funnel report.

FIG. 7 is a display diagram showing a funnel report for a process that ends in an undesirable result.

DETAILED DESCRIPTION

Embodiments of the present invention provide a facility for displaying the extent of completion of a process ("the facility"), such as a Web browsing process. Some embodiments of the facility display reports on the extent to which users have completed a Web browsing process on a particular Web site. In some embodiments, the facility enables users to define a segment of users that is populated with users that have completed the process up to a particular step of the process.

Figure 6:
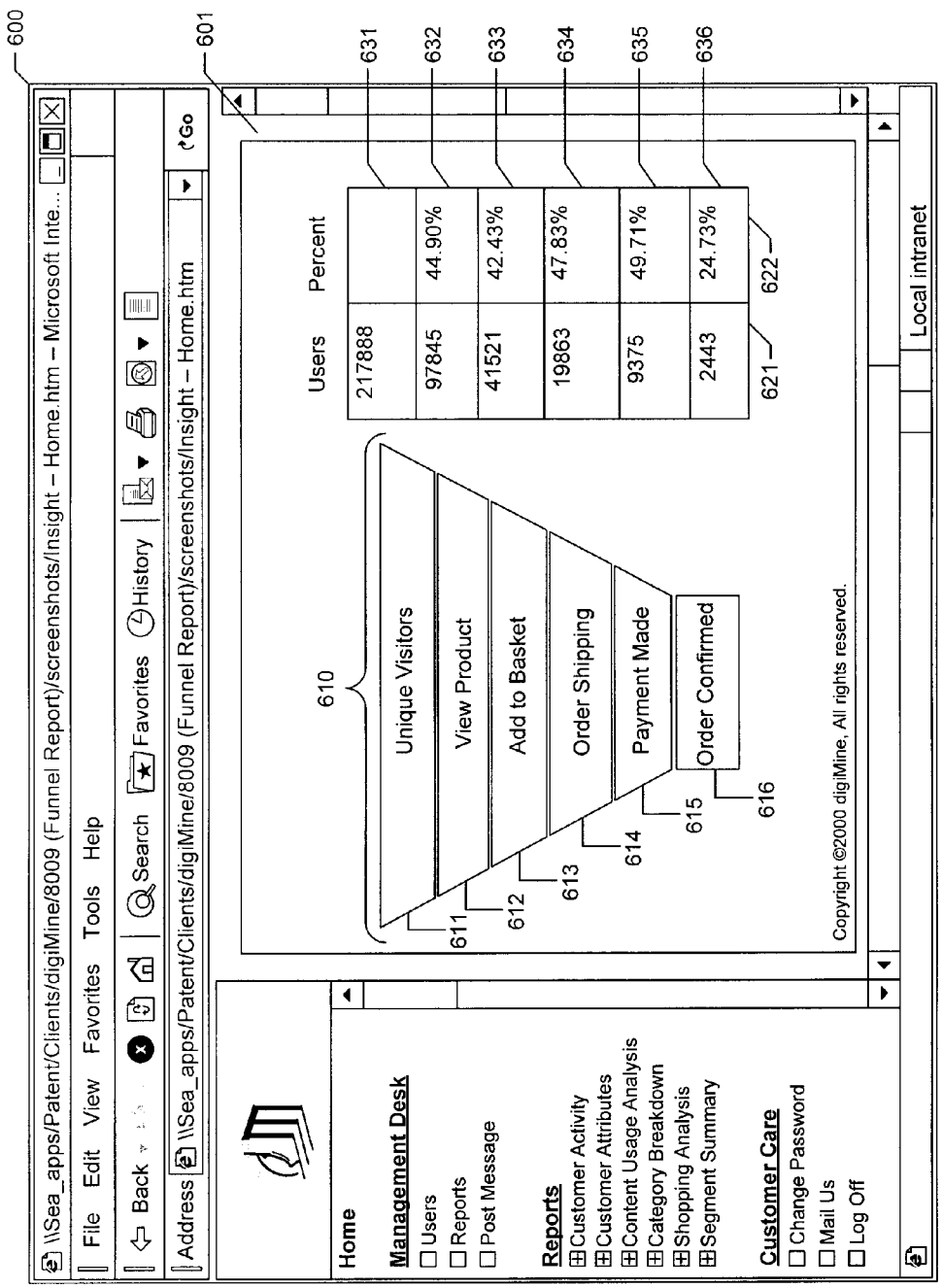
FIG. 6 is a display diagram showing the display of the defined funnel report by the facility.

The facility enables a report user to define a process by identifying a number of steps in the process and the order in which the steps are performed. In one embodiment, the user selects these steps, such as Web browsing events, from a list displayed by the facility. For example, a user may define a funnel report for analyzing the process of finding and purchasing a product on the Web site of a Web merchant. The facility then analyzes available data to determine the number of times each of the steps of the process was performed. For example, for a Web browsing process, the facility analyzes the contents of a Web server log for the corresponding Web site, called the "subject Web site." After this analysis, the facility generates a report showing, for a particular period of time, the number of times each of the steps in the process were performed. In particular, the facility preferably displays these numbers adjacent to a funnel shape that depicts as declining the number of times that each successive step was performed. Such a report is referred to herein as a "funnel report," or simply as a "funnel," and is shown in FIG. 6 and discussed further below.

In some embodiments, the facility enables the user to specify one or more of the steps of the process as corresponding to user segments. In response, the facility automatically creates user segments that are populated by users that complete the process up to the specified step. In some embodiments, these segments are each populated with only the users that complete the process to the specified step, and no further, whereas, in other embodiments, these segments are each populated with all of the users completing the process up to the specified step, including those users that complete the process up through a subsequent step of the process.

Figure 1:
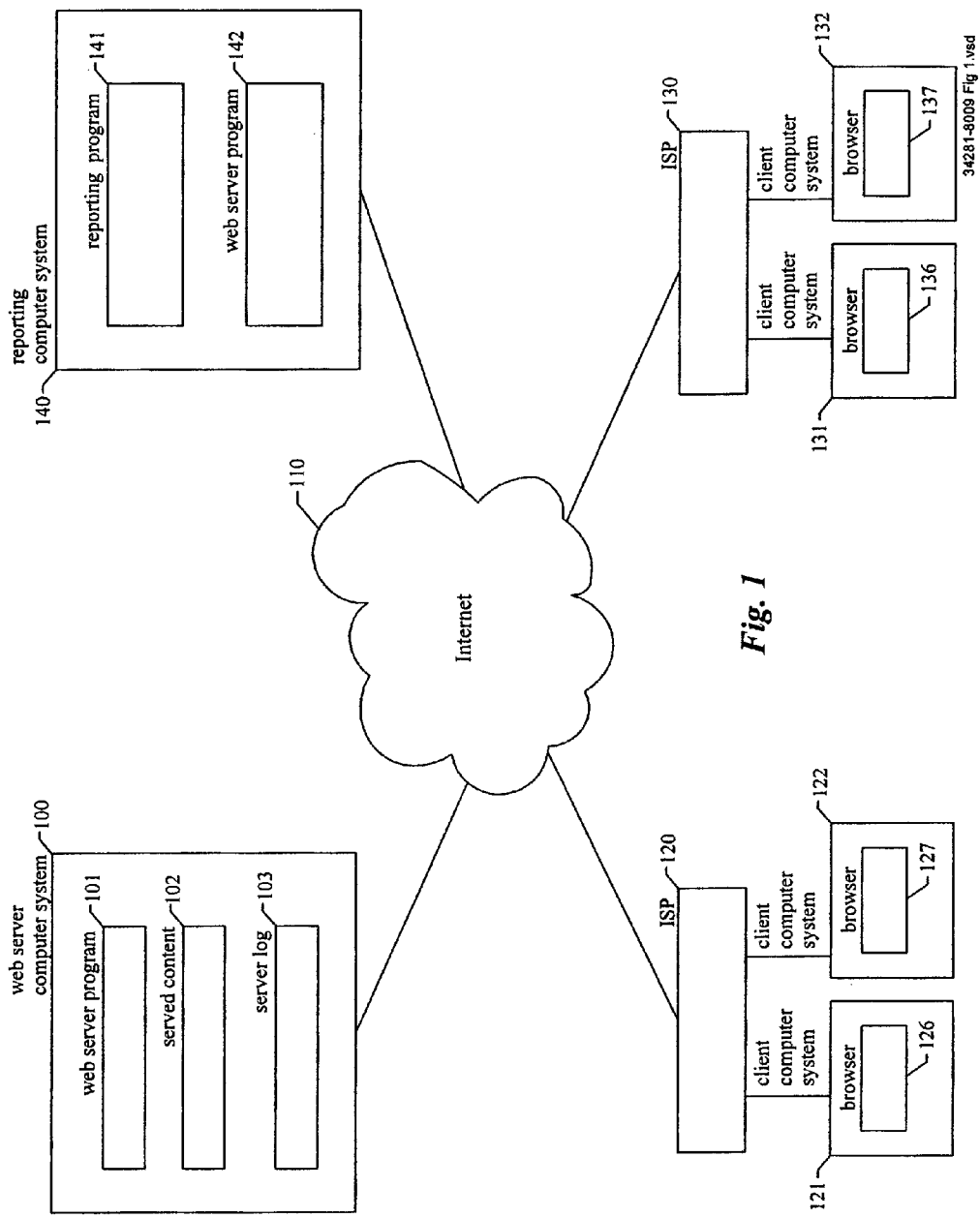
FIG. 1 is a high-level block diagram showing the environment in which the facility preferably operates.

FIG. 1 is a high-level block diagram showing the environment in which the facility preferably operates. The diagram shows a Web server computer system 100 that serves a Web site, user interactions with which are to be reported. On the Web server computer system are stored a Web server program 101 for serving the Web site, a content 102 of the Web site that is served, and a server log 103, containing an entry for each Web serving action performed by the Web server program. The Web server computer system is accessed by a number of client computer systems, such as client computer systems 121, 122, 131, and 132, in order to browse the Web site in response to user commands. Each client computer system is generally connected to the Internet 110 via an Internet service provider, or "ISP." For example, client computer system 121 and 122 are connected to the Internet via ISP 120, while client computer systems 131 and 132 are connected to the Internet via ISP 130. During browsing, Web pages of the Web site are displayed on the client computer system by a browser program, such as browser 126 on client computer system 121, browser 127 on client computer system 122, browser 136 on client computer system 131, and browser 137 on client computer system 132. In order to retrieve a Web page of the Web site or perform any other interaction with the Web site, the browser sends to the Web server computer system a Web server request, also called an "HTTP request." The Web server request contains a network address, called an "IP address" identifying the client computer system, the "source," or the "originator" of the request. The Web server request indicates the action to be taken by the Web server program, such as returning a specified Web page. If the Web server has stored a cookie for the Web site on the client computer system, the contents of this cookie are also included in the Web server request. When the Web server request is received in the Web server computer system by the Web server program, the Web server program takes the specified action, such as returning the specified file, and generates a server log entry containing the time and date, the originating IP address, the specified instruction, any cookie value included with the request, and various other details of how the request was handled, including how long it took to process and whether it was successful.

Reporting computer system 140 preferably stores a reporting program 141, which provides various functionality's of the facility, as well as a Web server program 142 for making reports generated by the reporting program available to users of any client computer system connected to the Internet, such as client computer systems 121, 122, 131, and 132.

While preferred embodiments are described in terms of the environment described above, those skilled in the art will appreciate that the facility may be implemented in a variety of other environments, including a single, monolithic computer system, as well as various other combinations of computer systems or similar devices.

Figure 2:
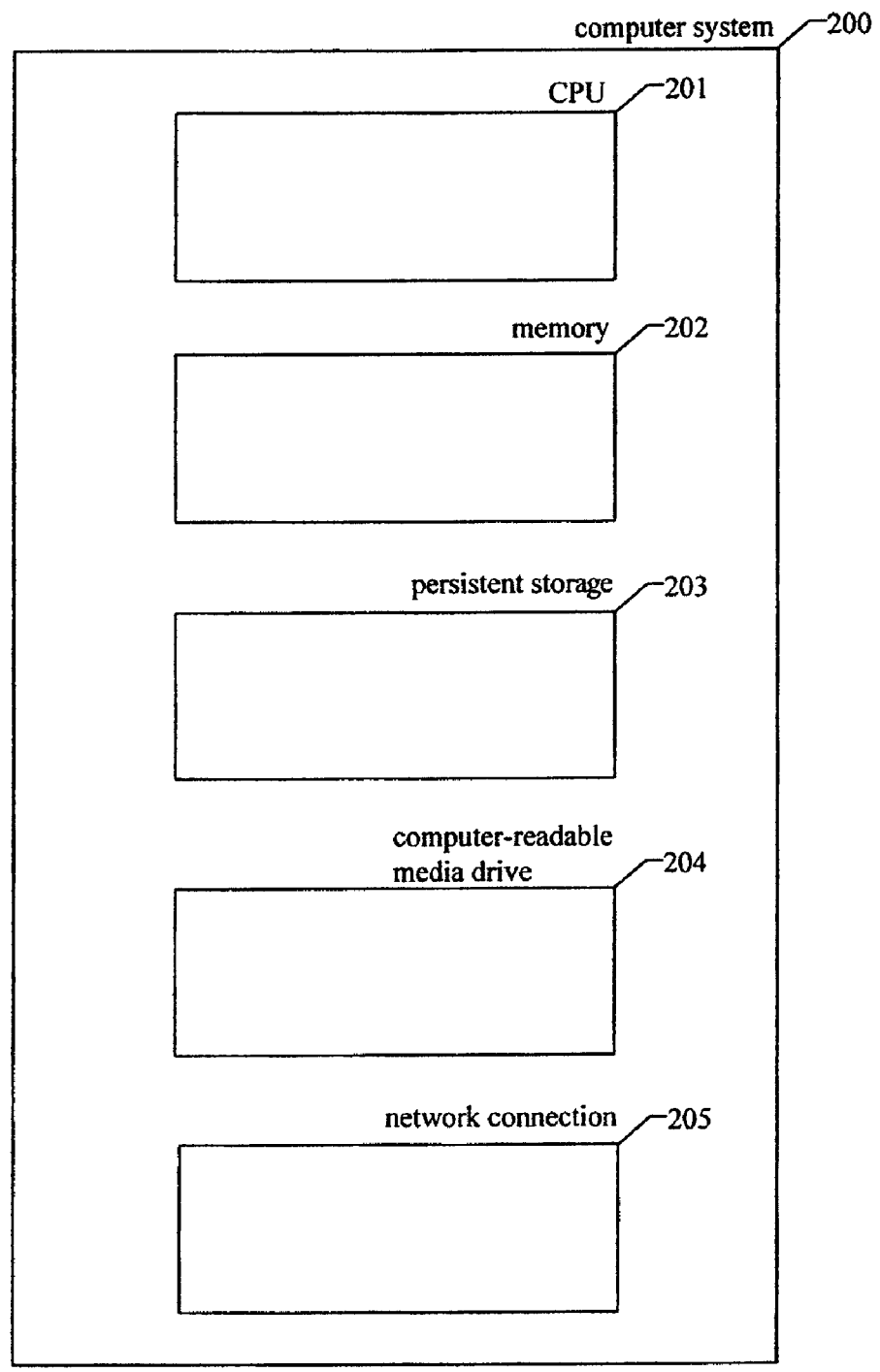
FIG. 2 is a block diagram showing some of the components preferably incorporated in the Web server, reporting, and client computer systems.

FIG. 2 is a block diagram showing some of the components preferably incorporated in the Web server, reporting, and client computer systems. These computer systems 200 preferably include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are preferably used to support the operation of the facility, those skilled in the art will appreciate that the facility may be implemented using devices of various types and configurations.

Figure 3:
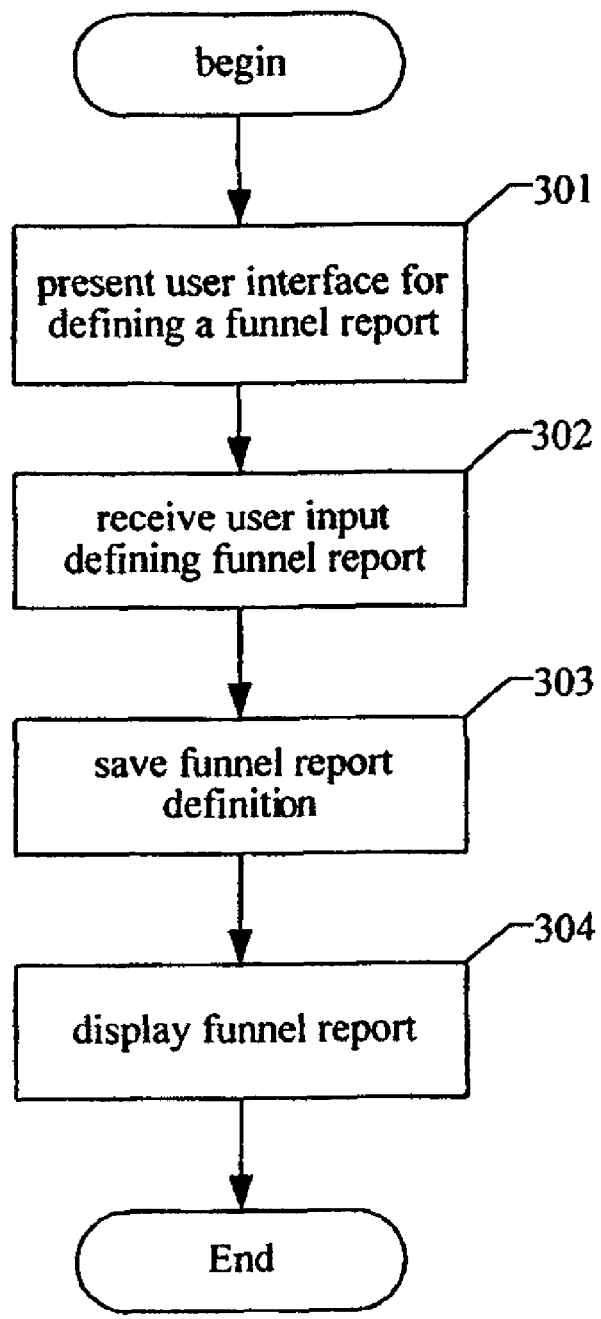
FIG. 3 is a flow diagram showing the steps preferably performed by the facility in order to define and display a funnel report.

FIG. 3 is a flow diagram showing the steps preferably performed by the facility in order to define and display a funnel report. In step 301, the facility presents a user interface for defining a funnel report. In step 302, the facility receives user input defining the funnel report via the presented user interface. FIGS. 4A-4G show this user interface and its use by a user to define a funnel report for a process of purchasing a product from a Web merchant.

Figure 4A:
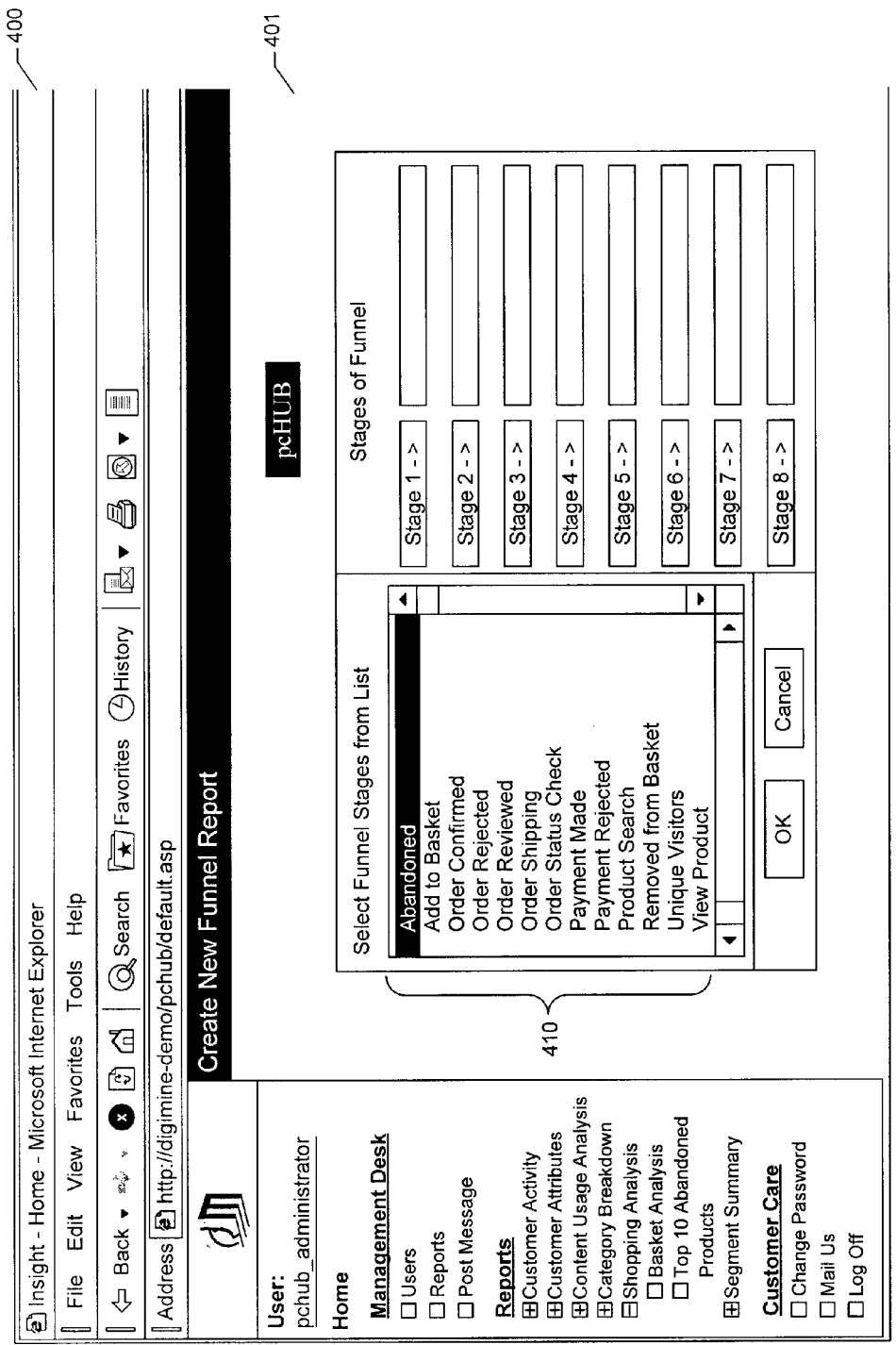
FIGS. 4A-4G show this user interface and its use by a user to define a funnel report for a process of purchasing a product from a Web merchant.

FIG. 4A is a display diagram showing the initial state of the funnel definition user interface. The user interface, displayed in client area 401 of browser window 400, includes a list 410 of Web site browsing event types that may be selected by the user to fill stage of the funnel report.

Figure 4B:
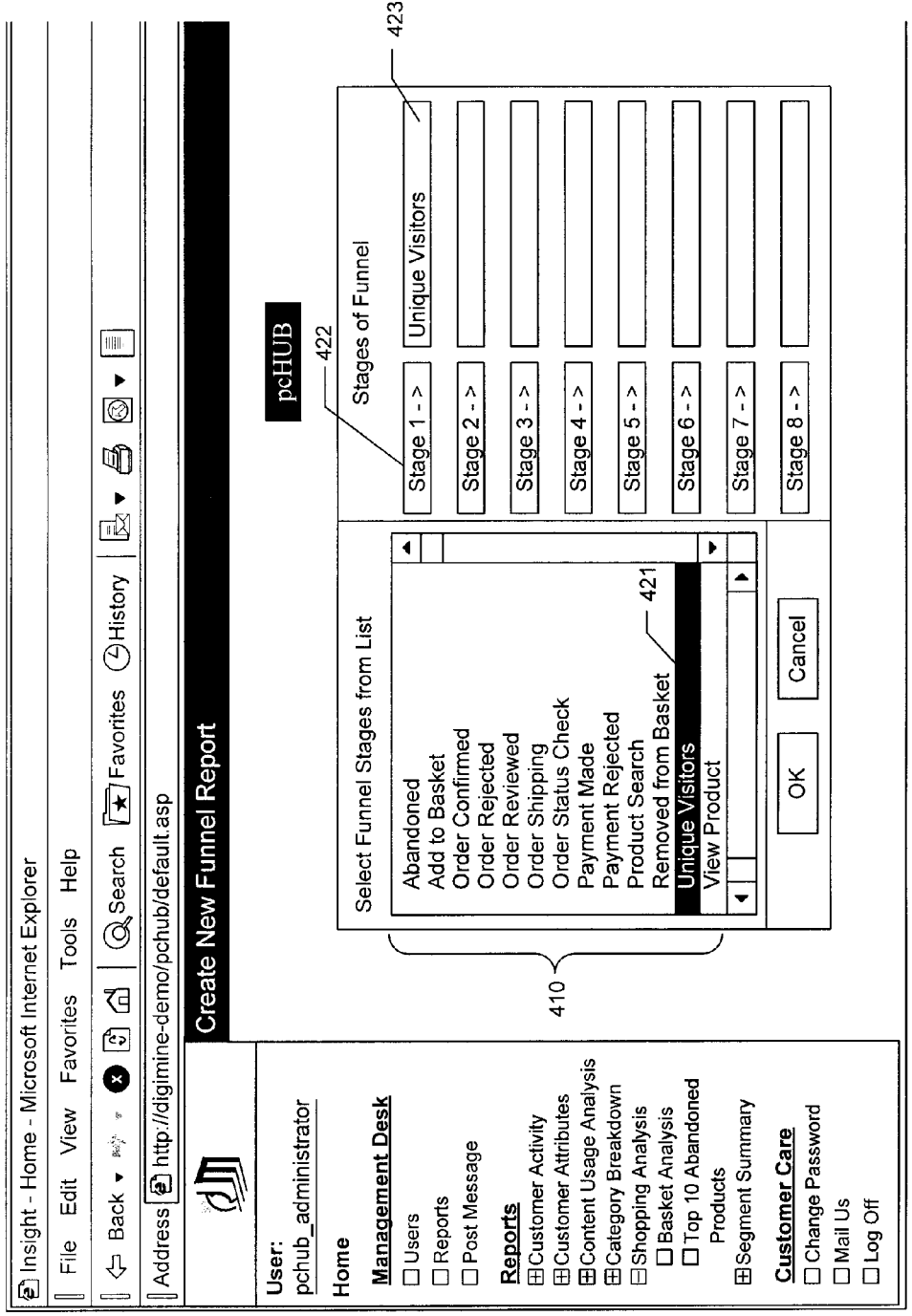

FIG. 4B is display diagram showing the selection of an event type for the first stage of the funnel. FIG. 4B shows the user selecting a Unique Visitors event type 421 from the event type list 410, then clicking the stage one button 422 to place the Unique Visitor's event type in the stage one field 423. Events of the Unique Visitor's event type preferably occur when a new user visits the subject Web site.

Figure 4C:
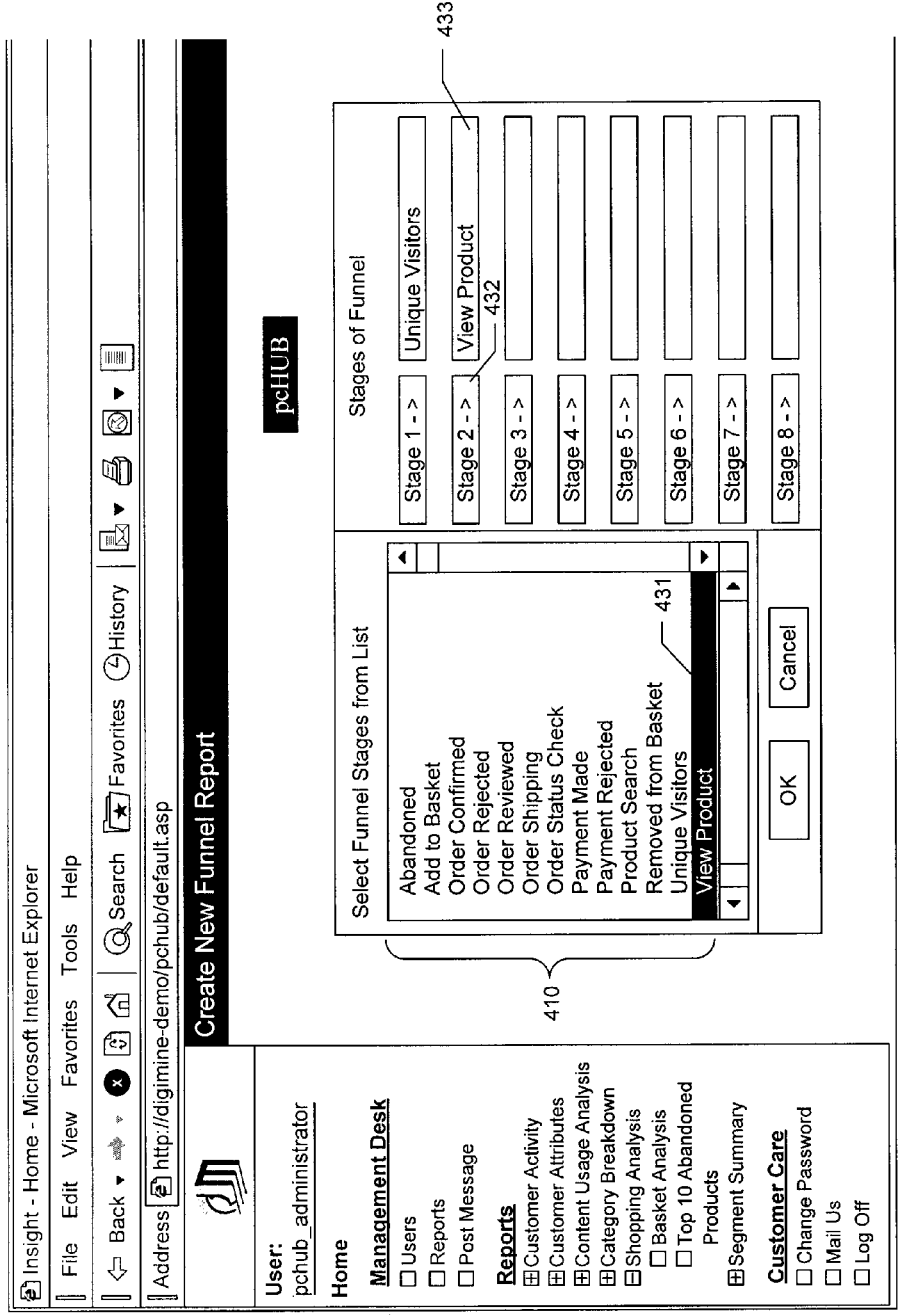

FIG. 4C is a display diagram showing the selection of an event type for the second stage of the funnel. FIG. 4C shows the user selecting a View Product event type 431 from the event type list 410, then clicking the stage two button 432 to place the View Product event type in the stage two field 433. Events of the View Product event type preferably occur when a user browses to a Web page on the subject Web site containing a product description.

Figure 4D:
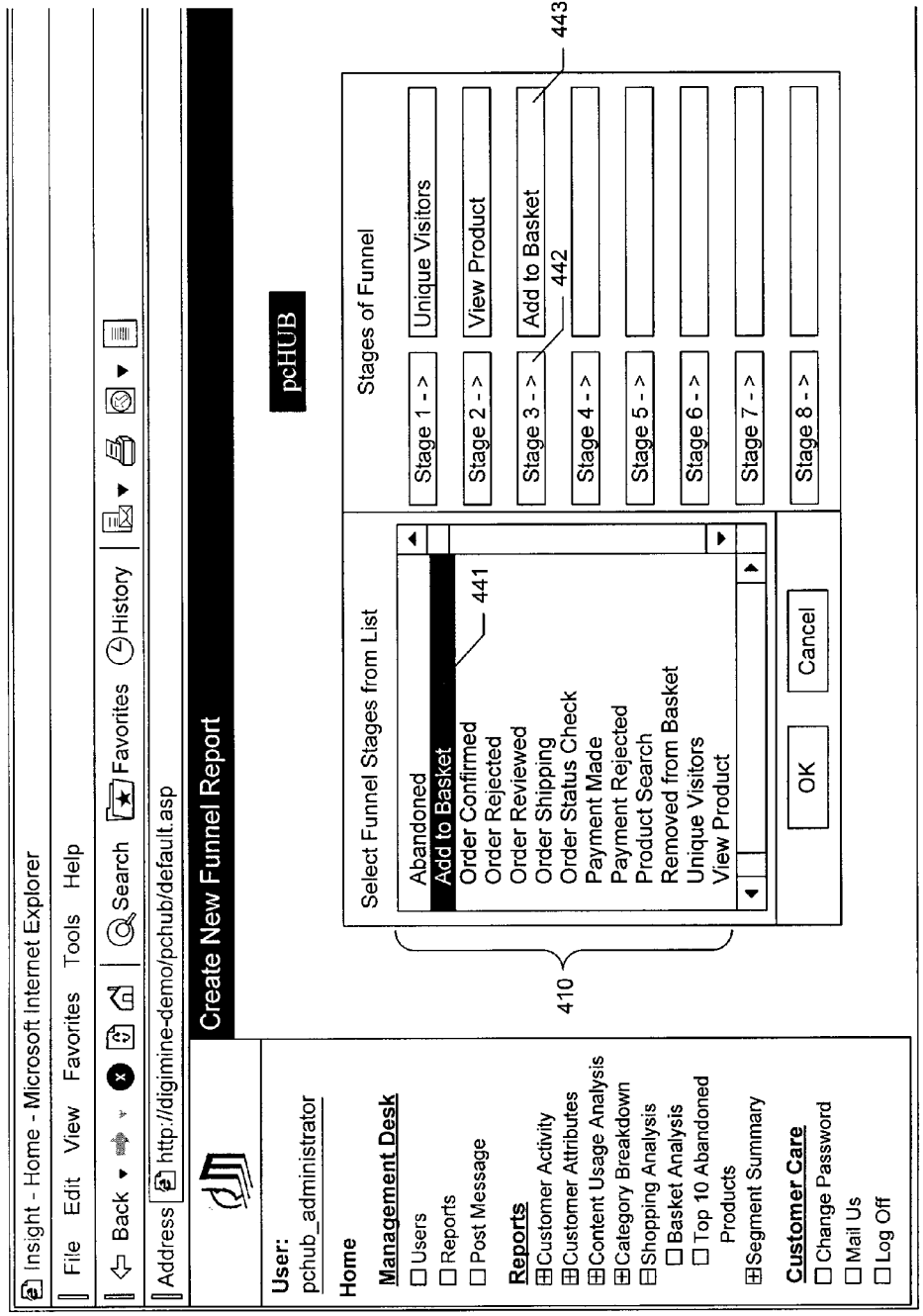

FIG. 4D is a display diagram showing the selection of an event type for the third stage of the funnel. FIG. 4D shows the user selecting an Add to Basket event type 441 from the event type list 410, then clicking the stage three button 442 to place the Add to Basket event type in the stage three field 443. Events of the Add to Basket event type preferably occur when a user clicks an add to basket button displayed on a product description Web page of the Web site in order to add the product described on that Web page to the user's shopping basket in order to begin the purchasing process for the product.

Figure 4E:
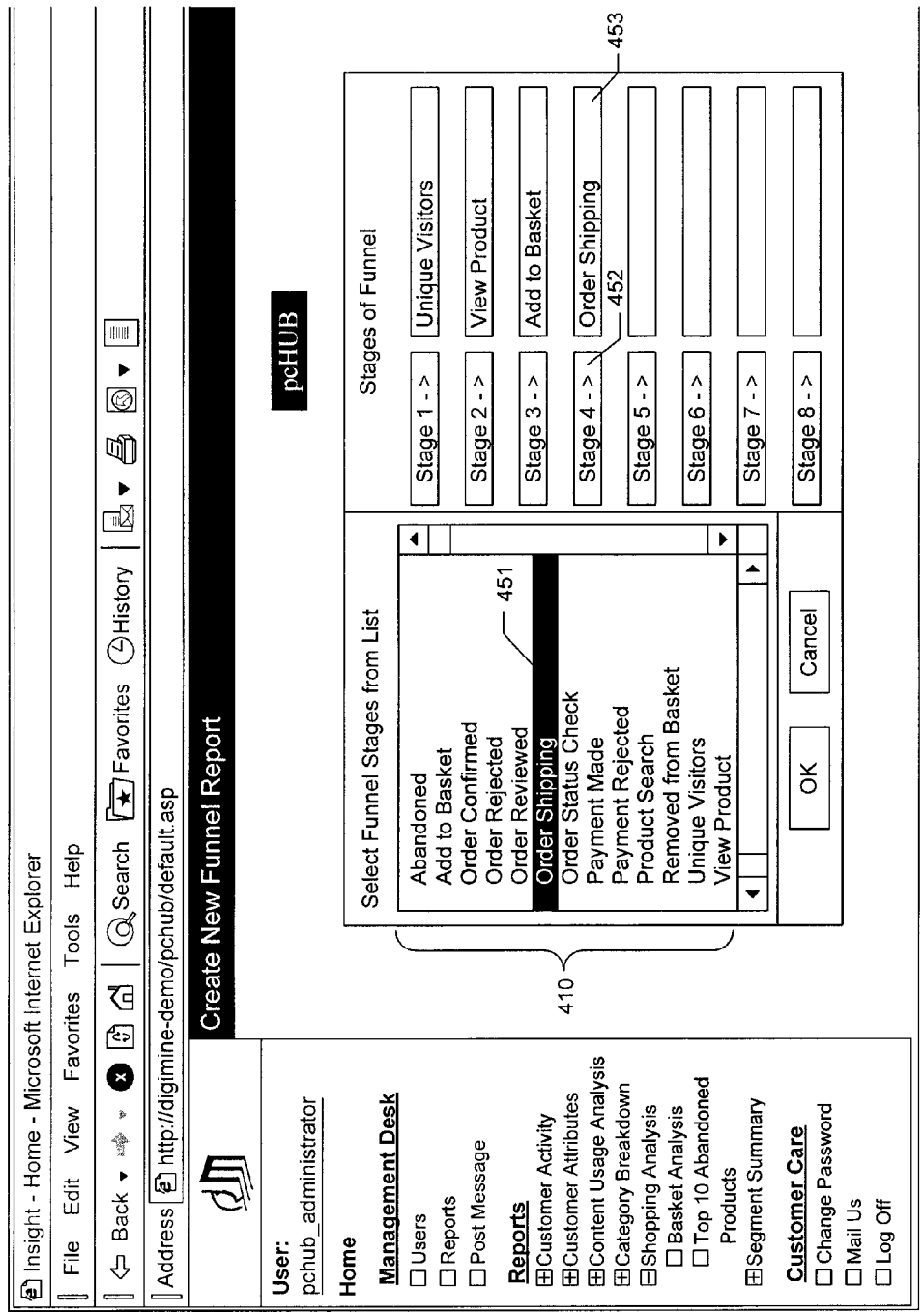

FIG. 4E is a display diagram showing the selection of an event type for the fourth stage of the funnel. FIG. 4E shows the user selecting an Order Shipping event type 451, then clicking the stage four button 452 to place the Order Shipping event type in the stage four field 453. Events of the Order Shipping event type preferably occur when the user completes a form requesting shipping information for use in shipping the product.

Figure 4F:
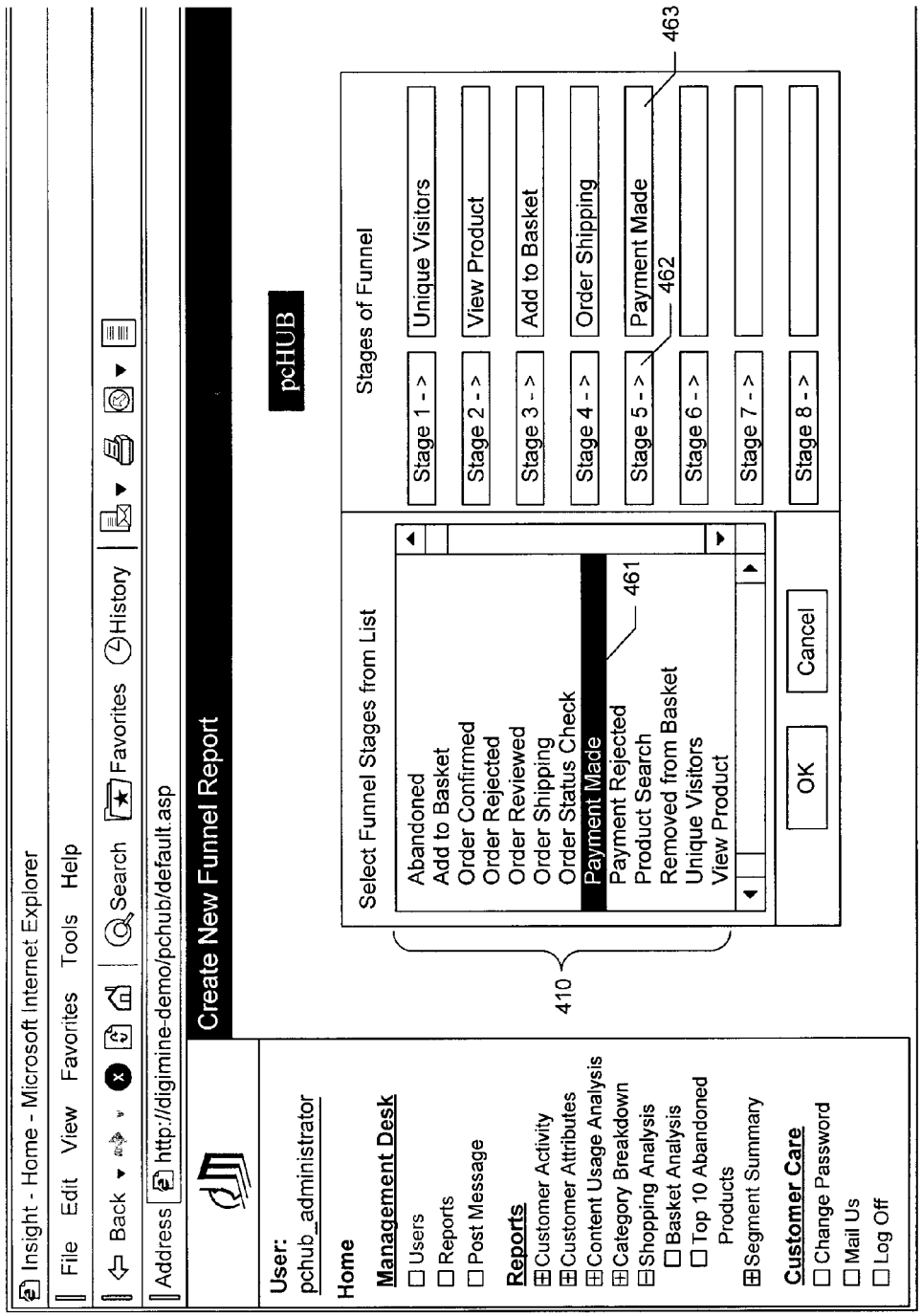

FIG. 4F is a display diagram showing the selection of an event type for the fifth stage of the funnel. FIG. 4F shows the user selecting a Payment Made event type 461 from the event type list 410, then clicking the stage five button 462 to place the Payment Made event type in the stage five field 463. Events of the Payment Made event type preferably occur when the user completes a form requesting payment information regarding the manner in which the user proposes to pay for the product.

Figure 4G:
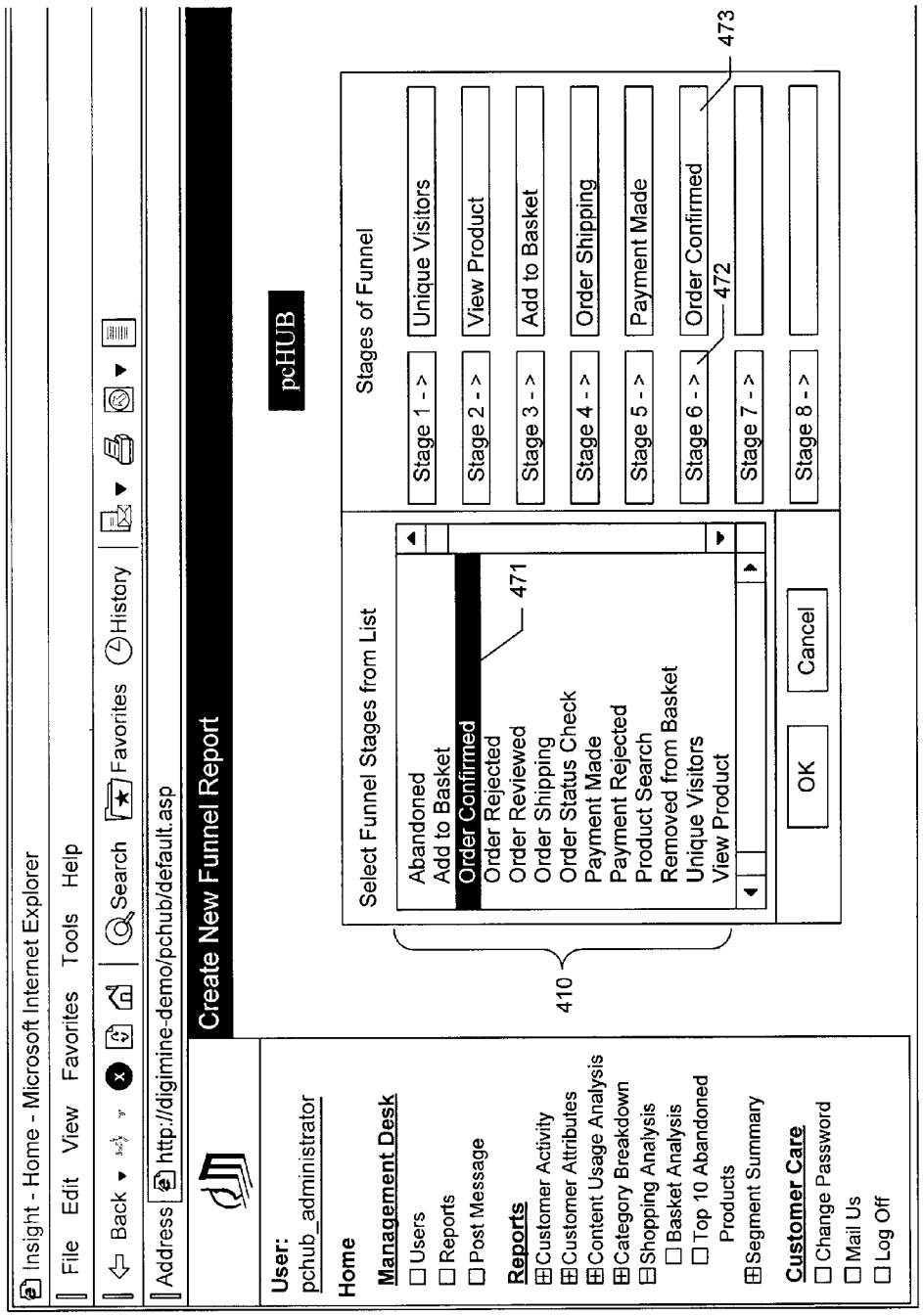

FIG. 4G is a display diagram showing the selection of an event type for the sixth stage of the funnel. FIG. 4G shows the user selecting an Order Confirmed event type 471 from the event type list 410, then clicking the stage six button 472 to place the Order Confirmed event type in the stage six field 473. Events of the Order Confirmed event type preferably occur when the user submits final confirmation of his or her order for the product, thereby completing the sale of the product.

In step 303, after the user has concluded defining the funnel report, the facility saves the created funnel report definition, enabling the report to be presented again at any time in the future.

Figure 4H:
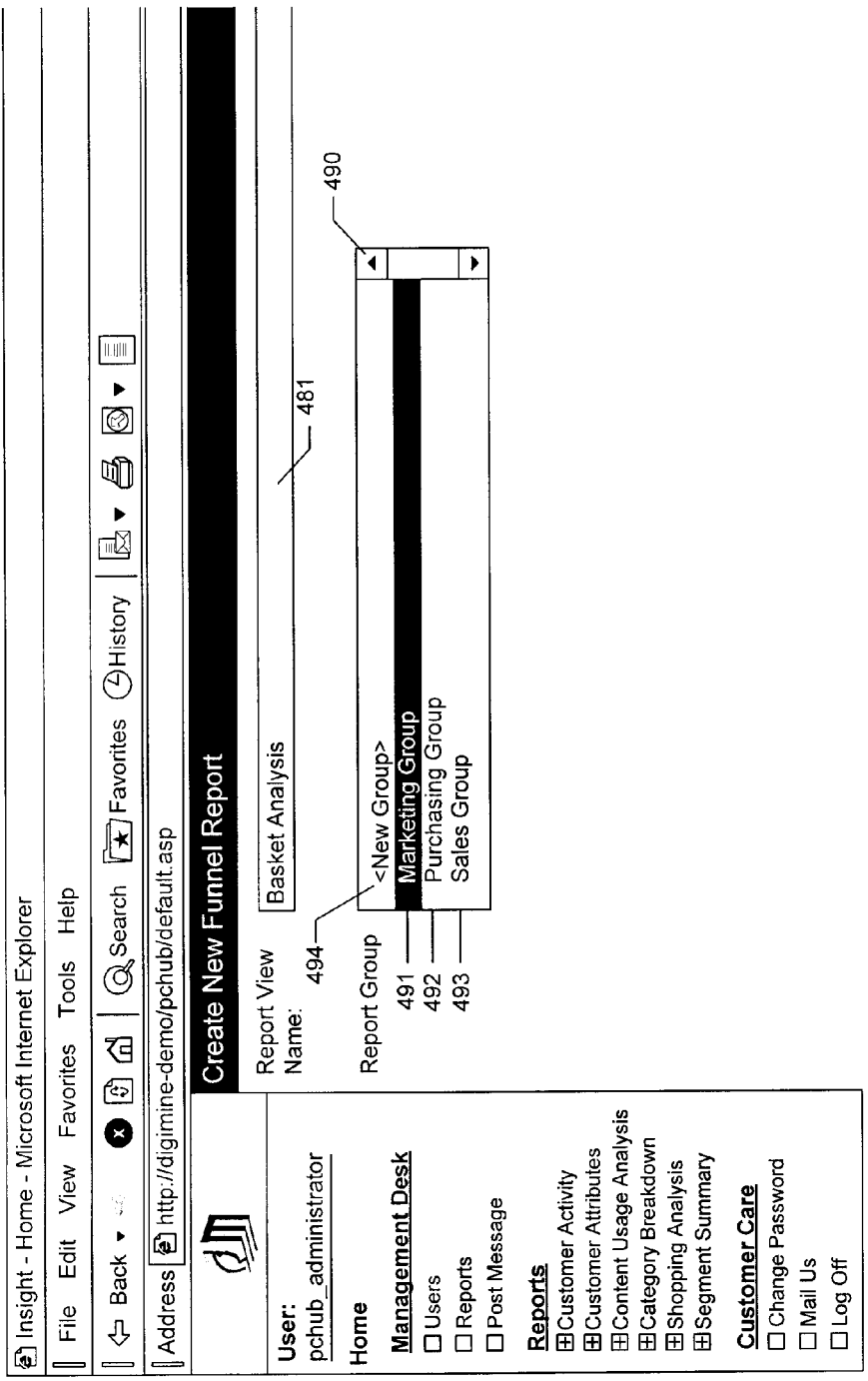
FIG. 4H is a display diagram showing a form displayed by the facility to obtain from the user a name to use to save the report.

FIG. 4H is a display diagram showing a form displayed by the facility to obtain from the user a name to use to save the report. FIG. 4H contains a report name field 481, into which the user can type or paste a name for the funnel report. FIG. 4H further contains report group box 490, from which the user may select a report group into which to place the funnel report as part of organizing the available reports. The user may select existing report groups 491-493, or may select new group entry 494 in order to create a new report group to contain the revised report. After the user enters this information, the funnel report defined by the user may be displayed at any time in the future by selecting the entered report name and selected report group.

In step 304, the facility displays the defined funnel report. After steps 304, these steps conclude.

The facility preferably displays the defined funnel report based upon data maintained in a data warehouse. Such a data warehouse may contain data obtained or derived from Web server logs, as well as additional data obtained in various ways. The creation and operation of such a data warehouse is described in U.S. patent application Ser. No. 09/613,408 and U.S. patent application Ser. No. 09/613,847, which are hereby incorporated by reference in their entirety.

FIG. 5 is a data structure diagram showing data preferably accessed by the facility in the data warehouse in order to display the defined funnel report. Table 500 is comprised of rows 531-539, each corresponding to one or more weeks, and each divided into the following fields: Week field 510 indicates the week or weeks to which the data in a row pertains; Visits field 511 indicates the number of times the subject Web site was visited during that week; Unique Visitors field 512 indicates the number of different users that visited the subject Web site during that week; view Product number field 513 indicates the number of product description Web pages within the subject Web site that were viewed during that week; View Product percentage field 530 indicates the percentage of unique visitors that viewed a product description Web page that week; Add to Basket number field 514 indicates the number of times a product was added to a shopping basket during that week; Add to Basket percentage field 524 indicates the percentage of viewed products that were added to a shopping basket that week; Order Shipping number field 515 indicates the number of times a shipping information form was completed during that week; Order Shipping percentage field 525 indicates the percentage of products added to basket for which shipping information forms were completed; Payments Made number field 516 indicates the number of payment information forms that were completed that week; Payment Made percentage field 526 indicates the percentage of completed shipping information forms for which payment information forms were completed; Order confirmed number field 517 indicates the number of order confirmations that were received that week; and Order Confirmation percentage field 527 indicates the percentage of payment information forms completed that week for which an Order Confirmed was received. For example, row 531 indicates that, in week 6, the subject Web site was visited 12029 times by 11967 unique visitors. Product description pages were viewed 5922 times, or 49.49% of the unique visitors. 2805 products were added to the shopping basket, or 47.37% of the viewed products. 1368 shipping information shipping forms were completed, or 48.77% of the products added to baskets. 669 payment information forms were received, or 48.9% of the number of shipping information forms that were received.

Row 540 contains the same values, aggregated for weeks 6-14. In this time, the subject Web site received 21869 visits from 21788 unique visitors. 97835 product descriptions were viewed, or 44.90% of the number of unique visitors. 41521 products were added to the shopping basket, or 42.43% of the number of viewed product descriptions. 19863 shipping information forms were completed, or 47.83% of the number of products that were added to a shopping basket. 9874 payment information forms were completed, or 49.71% of the number of shipping information forms that were completed. 2443 orders were confirmed, or 24.73% of the number of payment information forms that were completed. 169 order confirmations were received, or 25.26% of the number of payment information forms that were completed.

FIG. 6 is a display diagram showing the display of the defined funnel report by the facility. The funnel report is displayed in client area 601 of a Web browser window 600. The funnel report includes a funnel shape 610 comprised of segments 611-616. Each segment of the funnel represents a stage of the process, and is labeled with the event type selected by the user for that stage. For example, segment 611 represents the first stage of the funnel and is labeled with the Unique Visitors event type selected for the first stage. It can be seen that the funnel tends to narrow from the top toward the bottom, reflecting a declining number of events of the event type represented by each successive stage of the funnel. In various alternative embodiments, the facility displays different shapes that visually convey the same trend, such as inverted pyramids or triangles. The shown segments are all trapezoids, except for segment 616, which is a rectangle. In alternative embodiments, the segments have a variety of other shapes. As shown, the segments are of a generally uniform height and decline in width as they progress from the first segment to the sixth segment. Alternative embodiments of the facility convey the declining trend in a variety of other ways, including declining segment height, and declining segment area. As displayed, the segments are displayed in shades that become darker with each successive segment. In additional embodiments, the segments are also displayed in varying hues or colors.

Next to each segment of the funnel is displayed metrics 631-636, each including a number of events 621 of the event types represented by the stage, as well as the percentage 622 of the preceding number that this constitutes. For example, for the second, View Product stage 612, 97845 event occurrences are displayed, as well as an indication that this number represents 44.90% of the number of Unique Visitor events. Additional embodiments display the number of event occurrences as a percentage of various other values, such as the value for the event type of the first stage, or a value not displayed in the funnel report.

Figure 7:
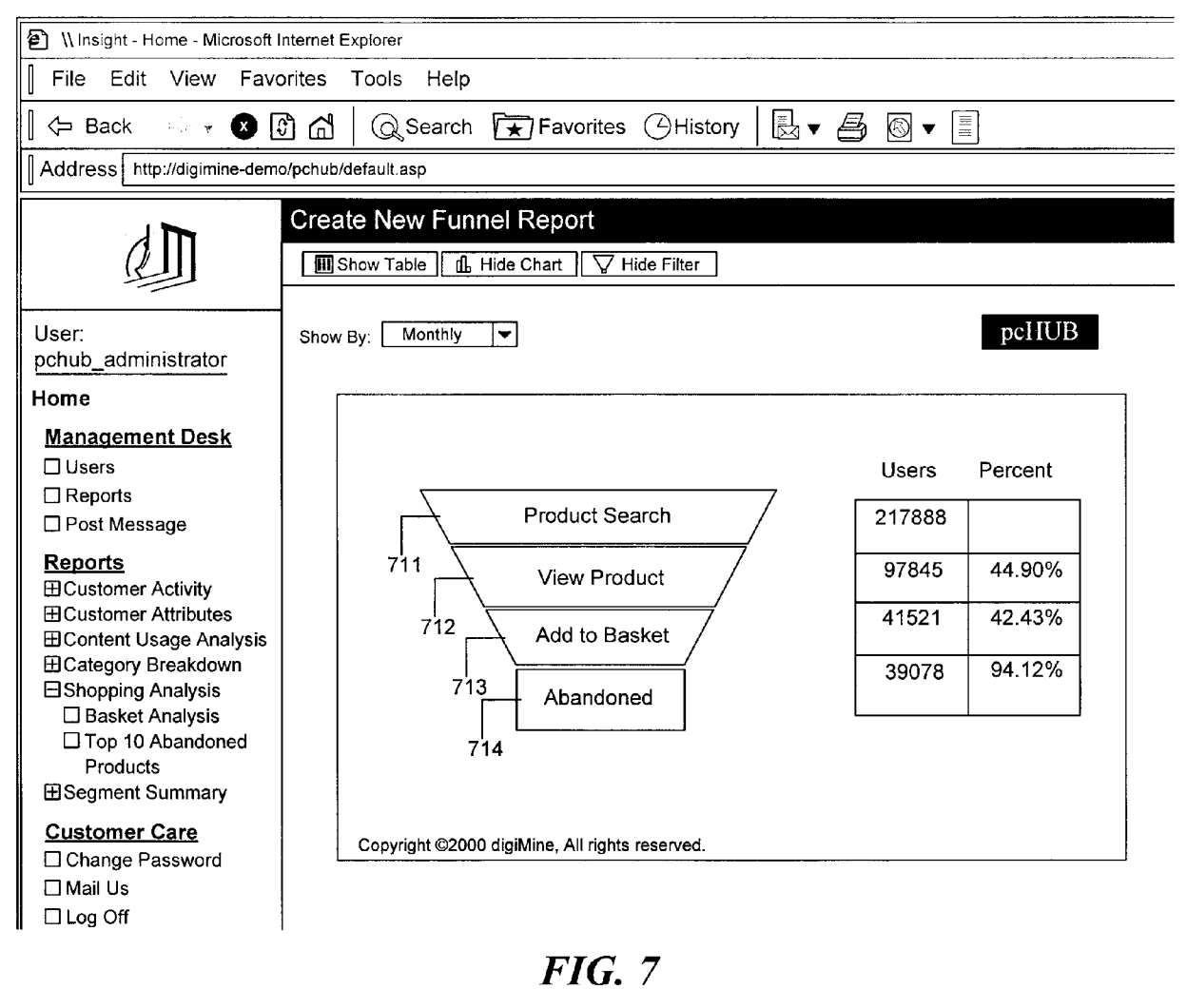

While many funnels are designed to track valuable processes that culminate in an important goal or objective, a user may define a funnel for any sequence of events, including those that end in an undesirable result. FIG. 7 is a display diagram showing a funnel report for a process that ends in an undesirable result. It can be seen that, while the first three stages 711-713 of this funnel represent positive event types Product Search, View Product, and Add to Basket, respectively, the fourth stage 714 represents negative event type Abandoned. Events of the Abandoned event type preferably occur when a product is added to a shopping basket is not ultimately purchased.

Figure 8A:
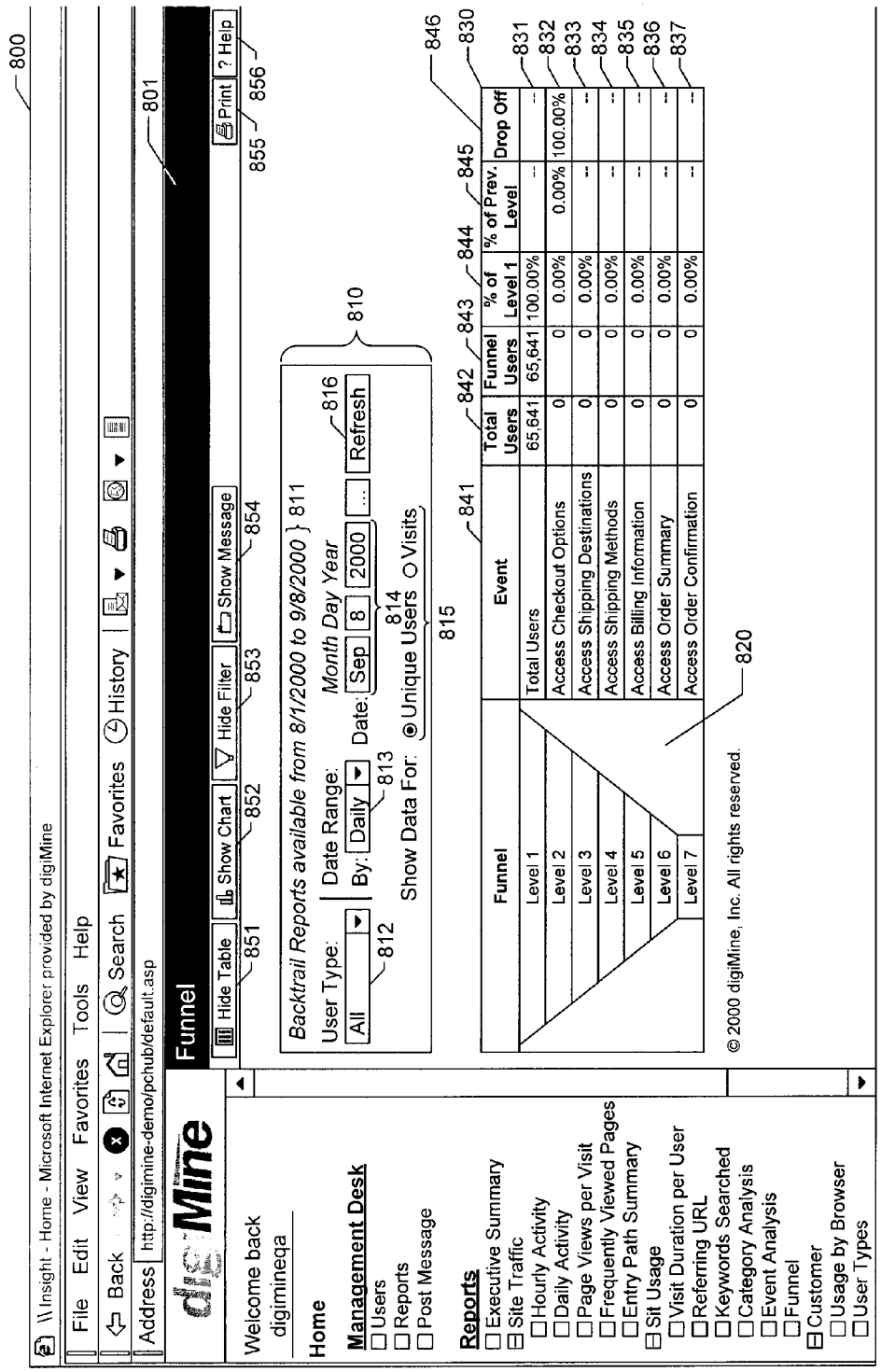
FIGS. 8A-8E are display diagrams showing an alternative funnel report generated by the facility.

FIGS. 8A-8E are display diagrams showing an alternative funnel report generated by the facility. FIG. 8A is a display diagram showing an alternative type of funnel report generated by the facility. The funnel report is displayed in client area 801 of a Web browser window 800. The funnel report includes funnel shape 820 comprised of segments each representing a stage of the process. Adjacent to the funnel shape is a process table 830. Rows 831-837 of the process table each correspond to a stage of the process and the corresponding funnel segment. For instance, row 832 of the process table corresponds to the "Access Checkout Options" stage of the process, and corresponds to level 2 of the funnel shape. Each row in the process table has an event or stage name field 841, a total users field 842, a funnel users column 843, a percentage of level 1 field 844, a percentage of previous level column 845, and a drop off column 846. In addition, the funnel report contains a filter section 810, which in turn contains controls for filtering the data set used to generate the funnel report. The filter section 810 includes a user type list box 812 that may be used by the user to specify the types of users to be included in the funnel report; a frequency list box 813 for specifying the length of time for which data is to be included in the funnel report; a date field 814 that the user may use to specify the date for which the funnel report is to be generated; radio buttons 815 that the user may use to specify whether the funnel report is generated from data for unique users or user visits; and a refresh button 816 that the user may click to regenerate the funnel report using the current filter settings. The filter section 180 further includes an indication 811 of the range of dates for which funnel reports may be generated.

The funnel report 801 further contains additional controls, including a hide table button 851 for hiding table 830; a show chart button 852 for displaying a bar chart corresponding to the funnel report data; a hide filter button 853 for hiding filter section 810; a show messages button 854 for displaying messages associated with the current funnel report; a print button 855 for printing the current funnel report; and a help button 856 for displaying help information for using the funnel report feature.

Figure 8B:
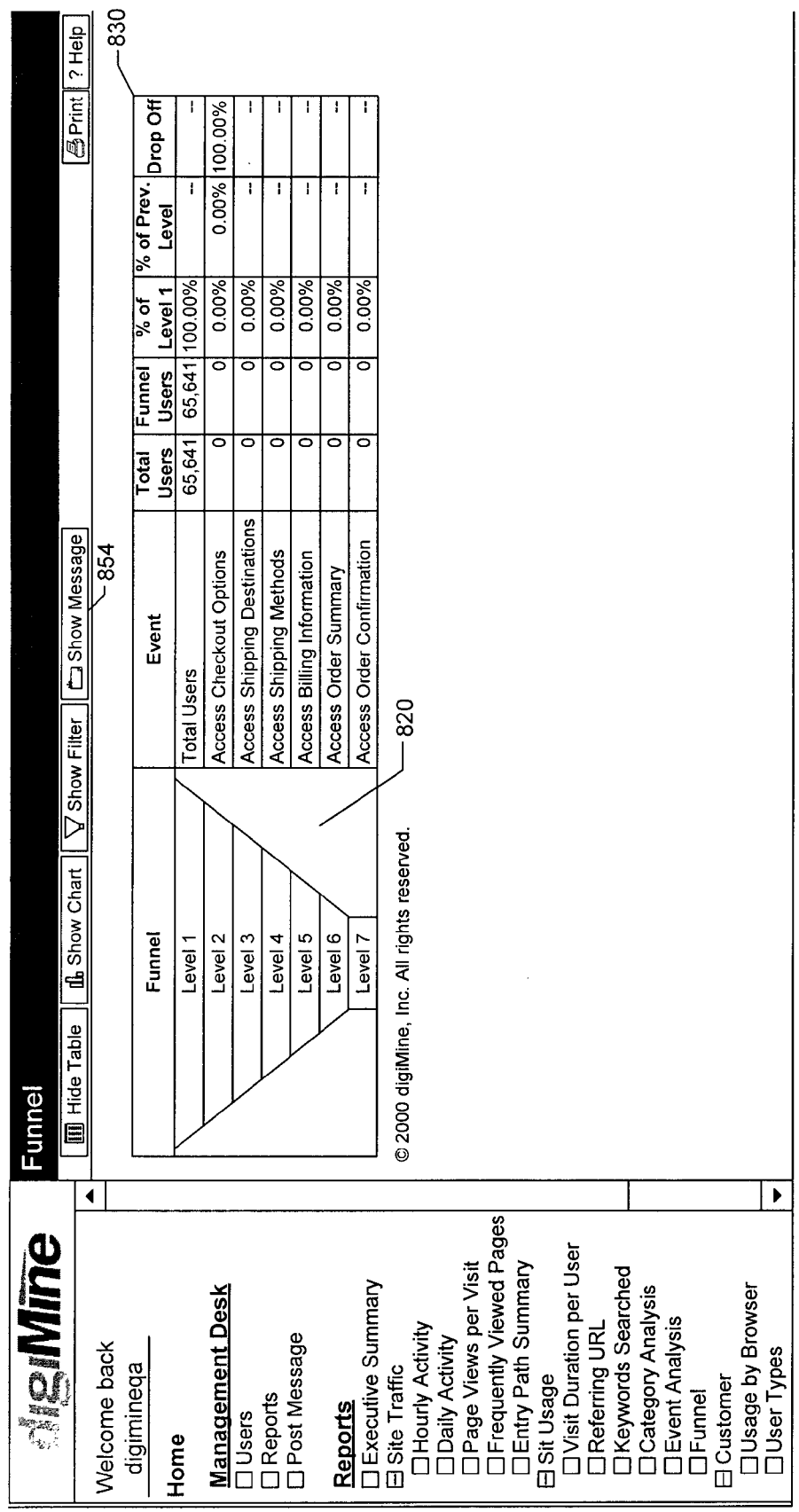

FIG. 8B is a display diagram showing the funnel report after the hide filter button 853 has been clicked. It can be seen that, in FIG. 8B, funnel shape 820 and process table 830 are displayed without filter section 810 shown in FIG. 8A.

Figure 8C:
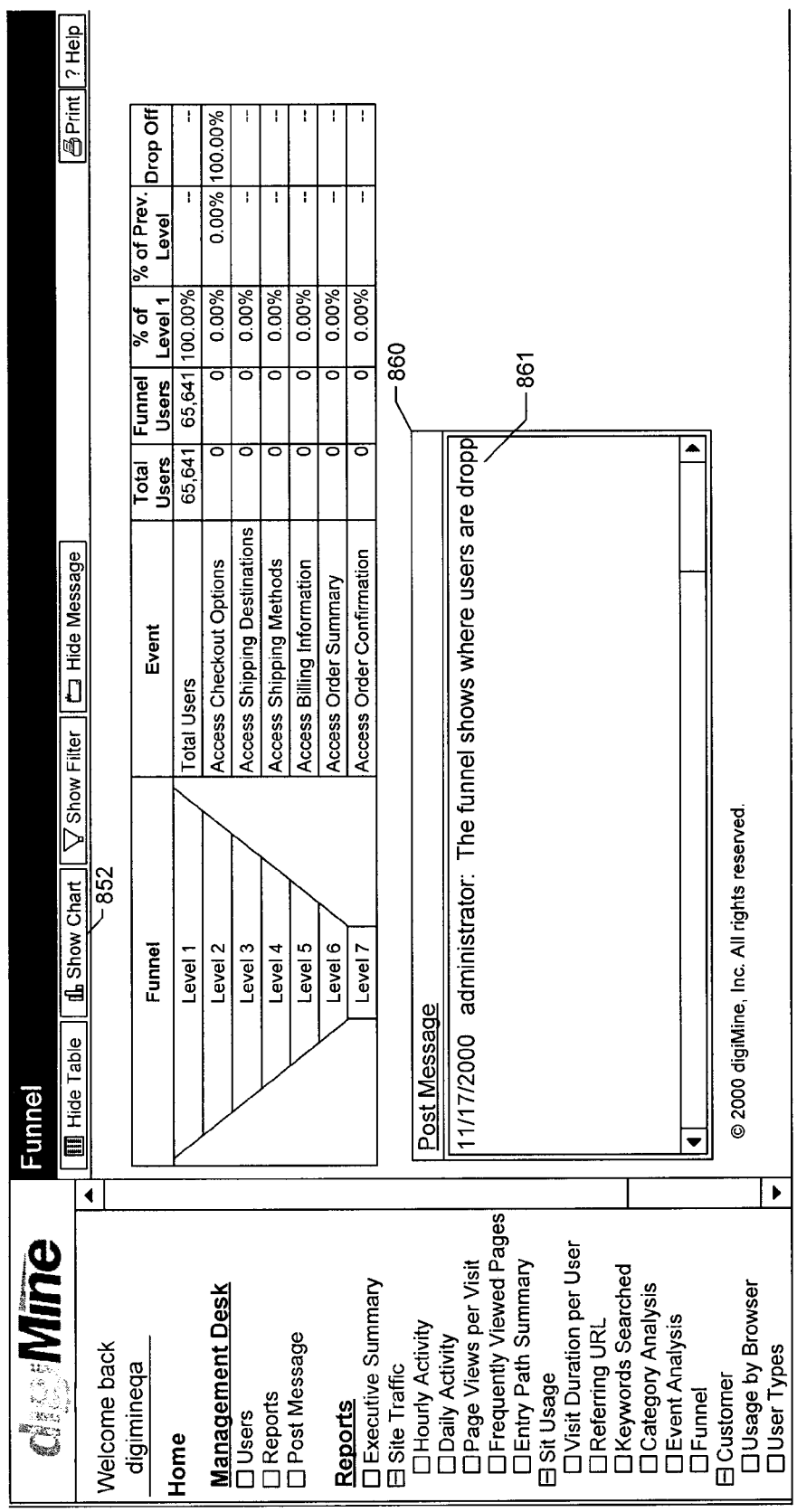

FIG. 8C is a display diagram showing the funnel report after show message button 854 has been clicked. It can be seen that, in FIG. 8C, a message section 860 is displayed containing a message 861 from the administrator. The user may click the Post Message link in message section 860 in order to post their own message to the message section.

Figure 8D:
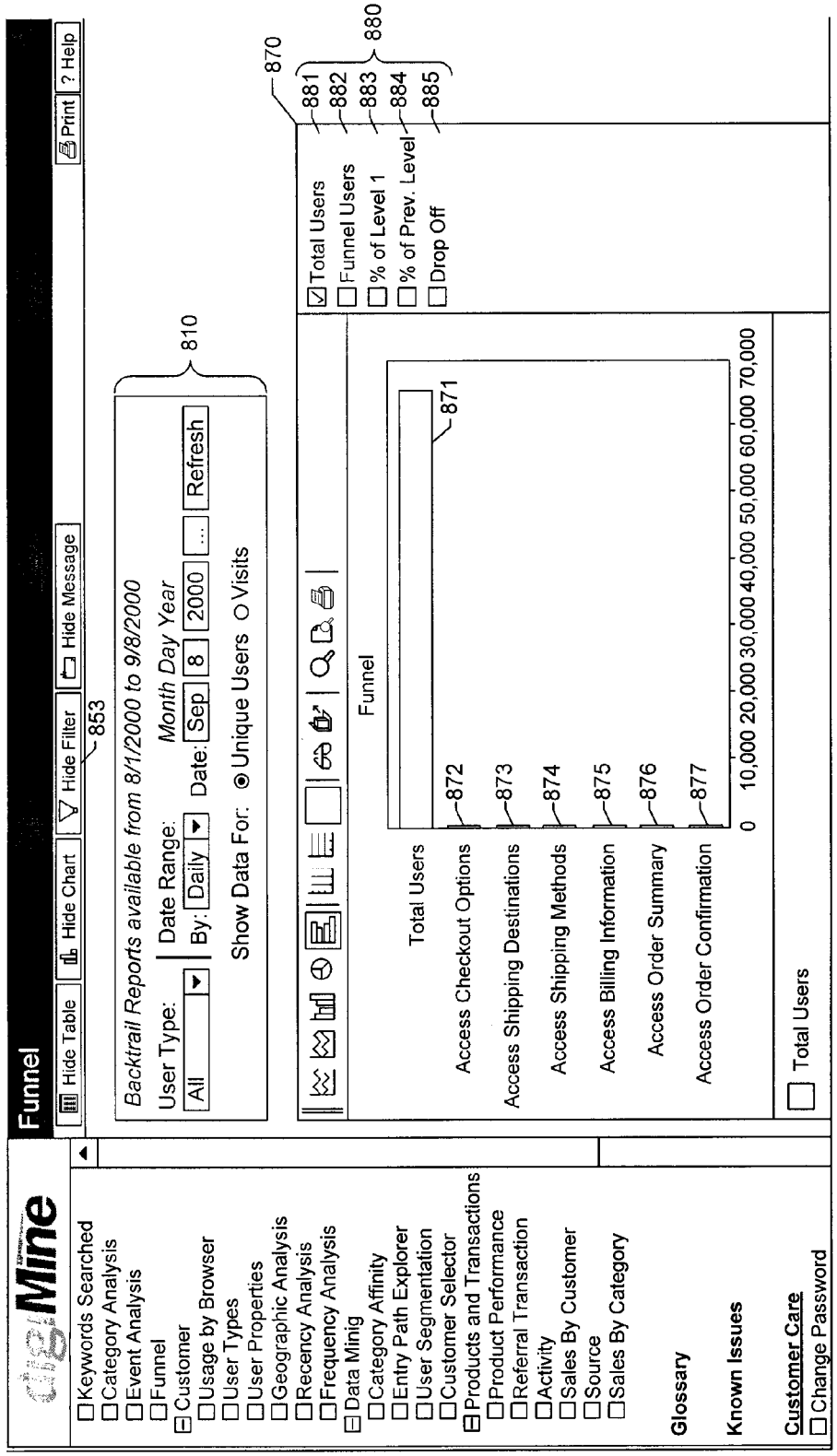

FIG. 8D is a display diagram showing the funnel report after the show chart button 852 has been clicked. It can be seen that funnel shape 820 and process table 830 shown in FIG. 8A have been replaced with bar chart 870. Bar chart 870 contains bars 871-877 showing the number of users that completed each stage of the process. The bar chart 870 further contains reported quantities check boxes 880 that the user may check or uncheck to select the quantities that are shown in the bar chart. It can be seen that total users check box 880 is checked, causing the quantity total users 881 to be displayed in the bar chart as shown by the legend at the bottom of the bar chart. The user may check any or all of the following check boxes, and optionally uncheck the total users check box, to change the quantities shown in the bar chart: funnel users check box 882 may be checked to show the number of users who have been designated specifically for the funnel report; percentage of level 1 check box 883 may be checked in order to include, for each stage, the percentage of users in level 1 that completed the stage; percentage of previous level checkbox 884 may be checked to show the percentage of the users that completed the previous stage of the process who also completed the current stage of the process; and drop off checkbox 884-885 may be checked to show how many users dropped off at each stage, rather than how many users completed each stage.

Figure 8E:
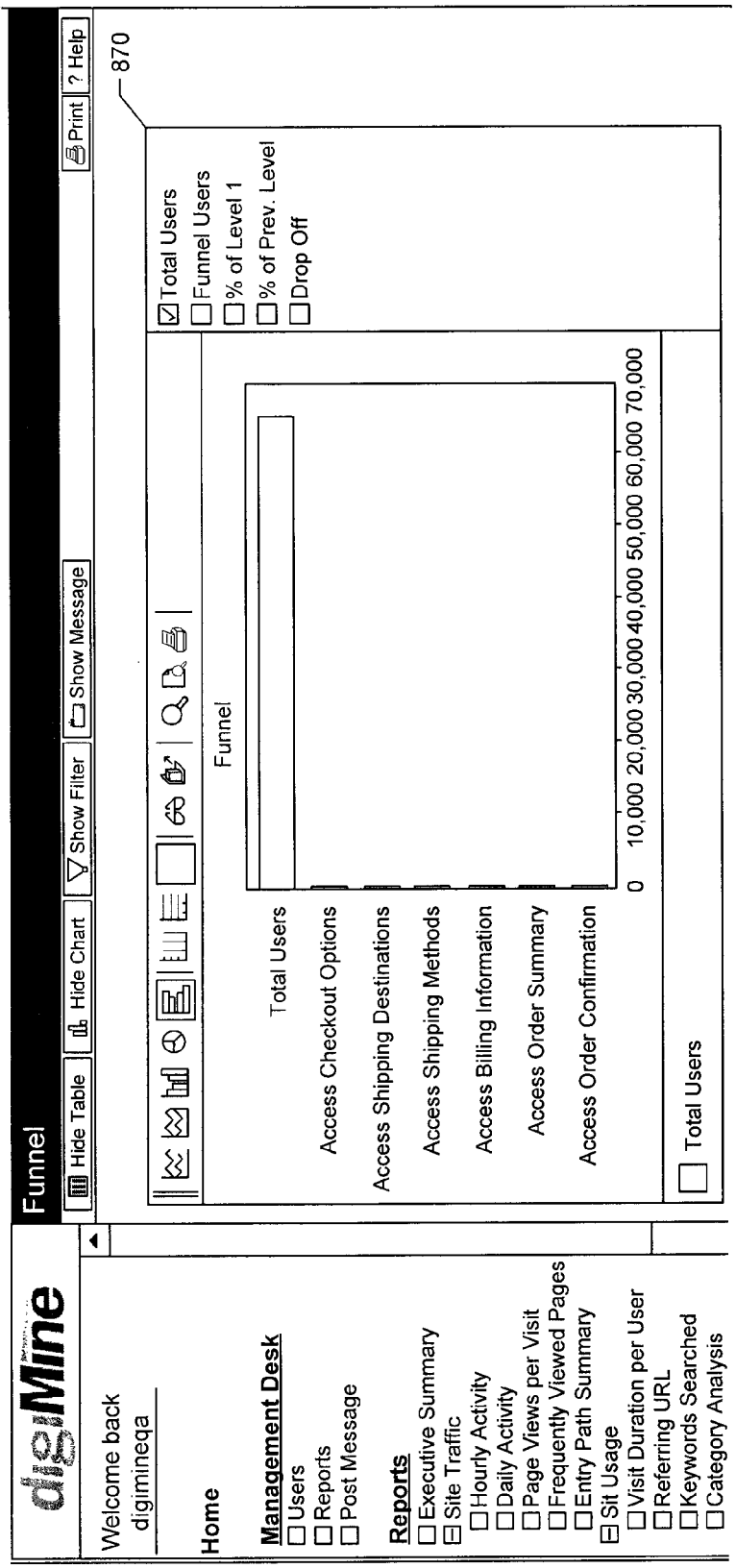

FIG. 8E shows the bar chart version of the funnel report after the hide filter button 853 has been clicked. It can be seen that, in FIG. 8E, the bar chart 870 is displayed without filter section 810 shown in FIG. 8D. Once a funnel has been defined, the user may preferably distribute it for use by others. Similarly, a distributor of the facility may distribute one or more funnel definitions, either with the facility or separately, to enable users to display certain funnel reports without engaging in the described funnel definition process.

Figure 9A:
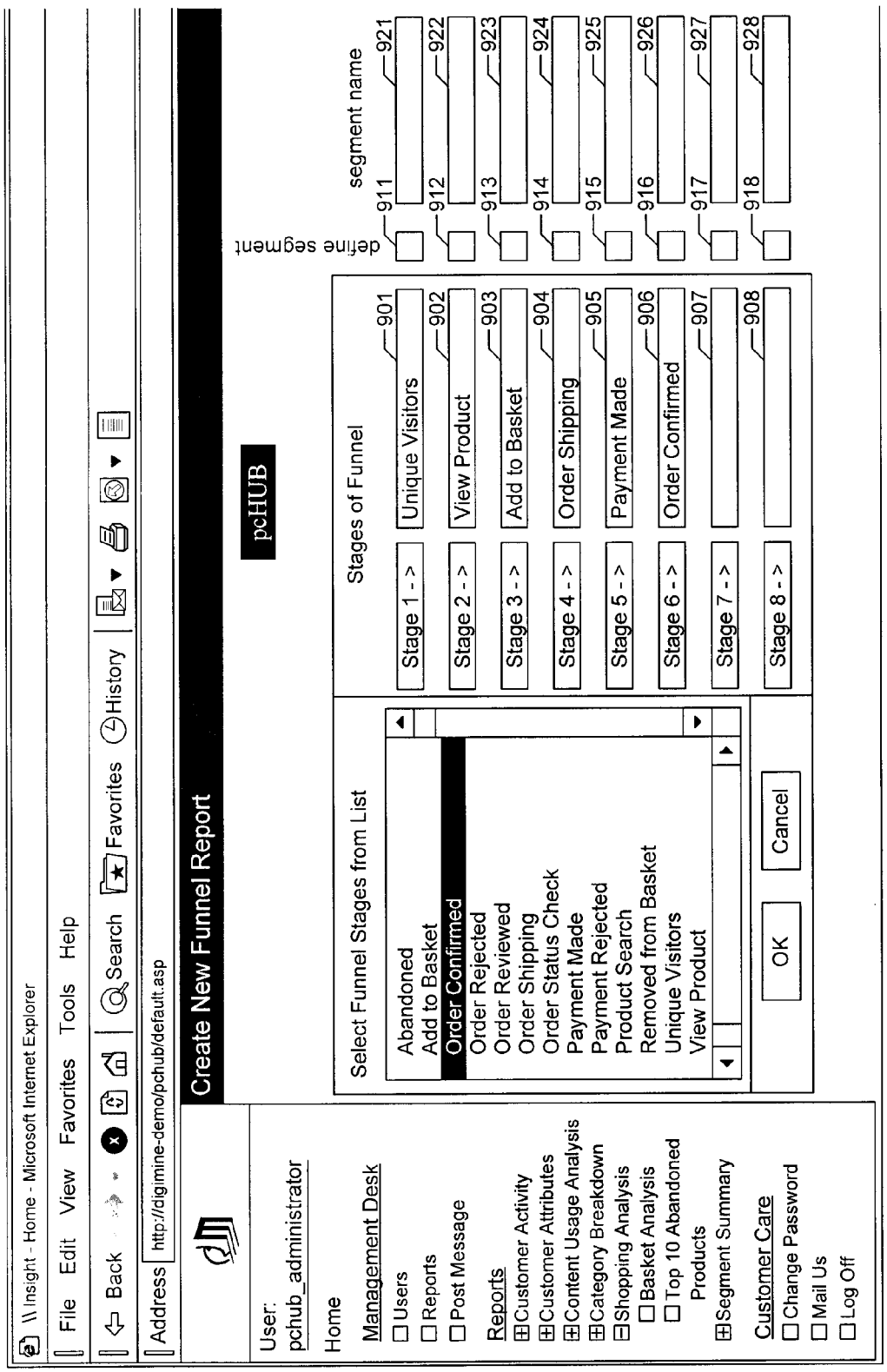
FIGS. 9A-9B are display diagrams showing a sample user interface provided by the facility for defining one or more user segments in conjunction with a process of purchasing a product from a Web merchant.
Figure 9B:
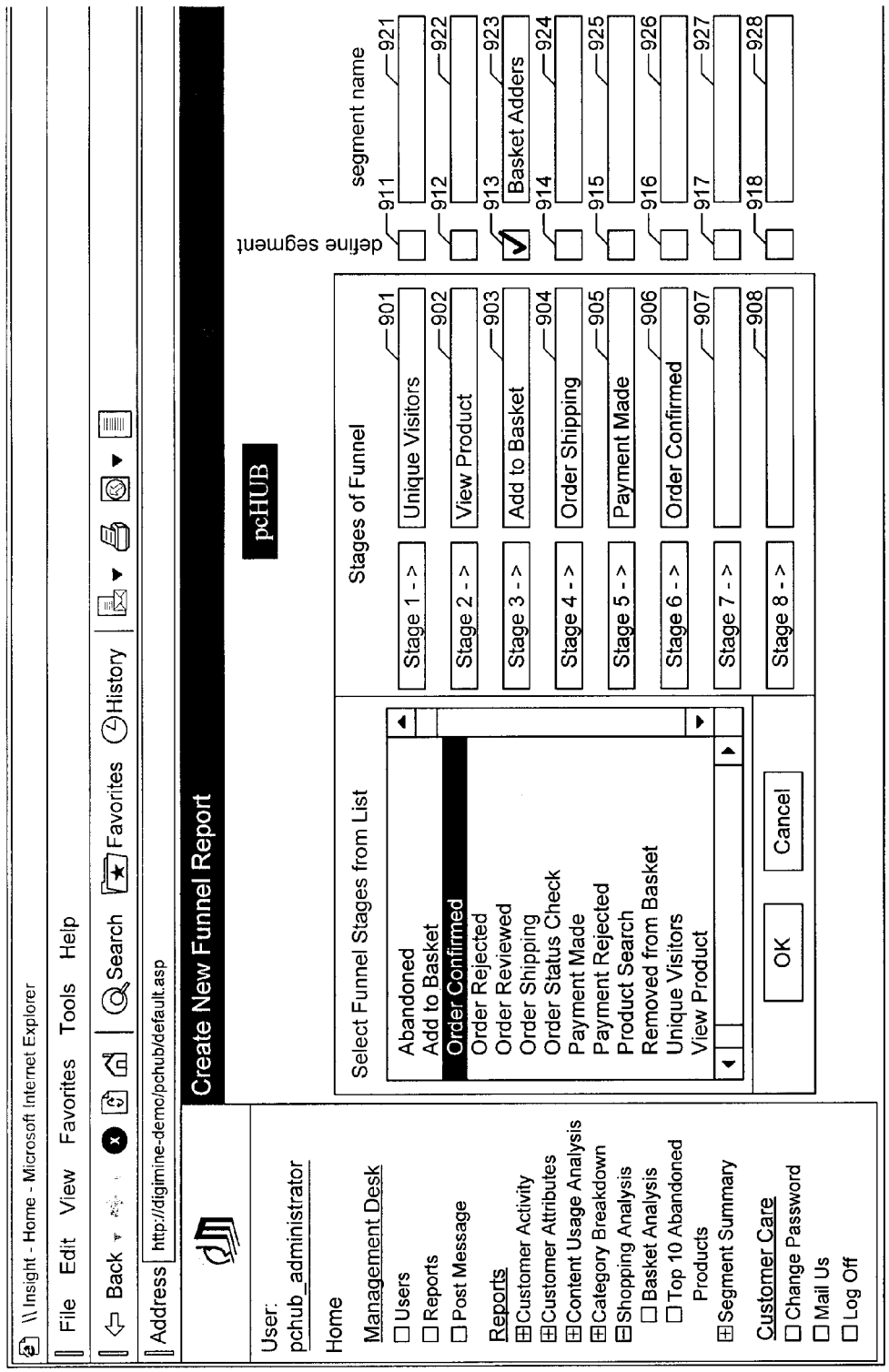

FIGS. 9A-9B are display diagrams showing a sample user interface provided by the facility for defining one or more user segments in conjunction with a process of purchasing a product from a Web merchant. FIG. 9A shows an initial state of this user interface. It can be seen that the display of FIG. 9A contains the process whose definition is shown in FIGS. 4A-4G, made up of steps 901-906, as well as two steps 907 and 908 that are unused here. The display further includes a column of check boxes 911-918, each corresponding to one of the steps of the defined process. The display further includes a column of segment name fields 921-928, also each corresponding to one of the steps of the defined process. In order to define a segment corresponding to one of the steps of the process, the user selects the check box corresponding to that step, and types the segment name in the corresponding segment name field.

FIG. 9B shows the user interface of FIG. 9A after the user has used the user interface to specify a segment. It can be seen that the user has checked check box 913, and entered the text "Basket Adders" to segment name field 923 in order to define a Basket Adder segment made up of users who have completed the defined process through the Add to Basket step 903. In some embodiments, the facility will populate this segment with users who have, during some selected foregoing period of time, completed the process through step 903, but no further, i.e., did not perform step 904 after performing step 903. With reference to FIG. 5, if this defined segment is populated based upon the data collected for week 14, the facility would populate the segment with the users who completed the Add to Basket step and are counted at the intersection of column 514 and row 539 (4194), except those who also completed the Order Shipping step, counted at the intersection of column 515 and row 539 (1973). In other embodiments, however, the segment is populated to contain all of the users who completed the Add to Basket step of the process, irrespective of whether those users completed later steps. In these embodiments, the facility populates the defined segment with all of the users who completed the Add to Basket step, counted at the intersection of column 514 and row 539, irrespective of whether those users completed subsequent steps.

The facility typically enables segments defined in this way to be populated in response to either automatic or manual initiation, at virtually any time, based upon a predetermined foregoing period of time, or a foregoing period of time specified by the user. Segment definitions created in this way may be stored persistently, as may be population results generated for such a segment. Such segments, when populated, may be used for a variety of purposes, including directing advertising campaigns to its members, such as proactive email campaigns, in which each member of the segment receives an email message containing an advertising message, or such as by making the segment the subject of a web advertising campaign, in which, when a member of the segment visits a web page covered by the campaign, the member may, based upon a variety of other factors, receive an advertising message corresponding to the campaign. In some embodiments, the facility exploits populated segments defined in this manner in some or all of the ways described in U.S. Patent Application No. 60/479,609, filed on Jun. 17, 2003; U.S. patent application Ser. No. 10/653,703, filed on Sep. 2, 2003; and U.S. patent application Ser. No. 10/733,815, filed on Dec. 10, 2003, each of which is hereby incorporated by reference in its entirety.

It will be understood by those skilled in the art that the above-described facility could be adapted or extended in various ways. For example, the facility may be used to generate funnel reports for processes of virtually any sort, including processes not related to user interactions with Web sites. Funnel shapes shown in the funnel reports generated by the facility may take a variety of forms, involving a variety of different shapes, colors, brightnesses, textures, numbering, etc. Characteristics of a segment, such as its width, height, area, or other characteristics may relate specifically to the number of events of the event type that it represents, rather than being of a generally declining or diminishing nature. While the foregoing description makes reference to preferred embodiments, the scope of the invention is defined solely by the claims that follow and the elements recited therein.

We claim:

1. A method in a computing system having a processor for defining a user segment, comprising:
    displaying names of each of a plurality of events;
    receiving first user input selecting a subset of the plurality of events for inclusion in a sequence of events;
    among the selected events, determining an order in which the events are likely to occur;
    generating a sequence of events in which the selected events occur in the determined order;
    receiving second user input identifying a distinguished one of the selected events; and
    in response to the second user input, with the processor, creating a new segment definition defining a segment to include users who have completed the generated sequence of events through the distinguished event.

2. The method of claim 1 wherein the created segment definition selects for inclusion in the segment users who have performed the distinguished event and the events that precede the distinguished event in the generated sequence, but not events that succeed the distinguished event in the generated sequence.

3. The method of claim 1 wherein the created segment definition selects for inclusion in the segment all users who have performed the distinguished event and the events that precede the distinguished event in the generated sequence.

4. The method of claim 3, further comprising using event performance data to populate the segment defined by the created segment definition by selecting users who the event performance data indicates have satisfied the segment definition.

5. The method of claim 4, further comprising storing persistently the users selected in populating the segment.

6. The method of claim 4, further comprising targeting an advertising promotion to the users selected in populating the segment.

7. The method of claim 6 wherein targeting an advertising promotion to the selected users involves autonomously transmitting a message to each of the selected users.

8. The method of claim 6 wherein targeting an advertising promotion to the selected users involves activating a web advertising campaign directed to the selected users.

9. A computer-readable storage device storing computer programs adapted to cause a computing system to define a user segment by:
    receiving user input selecting a plurality of events for inclusion in a sequence of events;
    establishing a sequence of events containing the selected events in an order that the selected events are likely to be performed by a user; and
    defining a new user segment to include users who have completed the established sequence of events only through a distinguished event in the sequence.

10. The computer-readable storage device of claim 9 wherein the contents of the computer-readable medium further cause the computing system to receive user input specifying the distinguished event.

11. The computer-readable storage device of claim 9 wherein the contents of the computer-readable medium further cause the computing system to populate the defined user segment.

12. The computer-readable storage device of claim 11 wherein the contents of the computer-readable medium further cause the computing system to target an advertising promotion to the users populated into the defined user segment.

13. A computing system for defining a user segment, comprising:
    a display device that displays an ordered set of steps making up a process;
    a user input device that receives user input selecting one of the displayed steps of the process; and
    a processor executing segment definition software that creates a new user segment definition that establishes a segment to include those users that complete the displayed process through the step selected by the user input received by the user input device.

14. The computing system of claim 13 wherein the processor further executes software that identifies a set of users whose performance of steps among the displayed steps qualify them as members of the segment defined by the created segment definition, and the computing system further comprising a memory that contains information identifying the set of users identified by the information contained by the segment population subsystem.

15. The computing system of claim 14 wherein the processor further executes software that targets an advertising promotion to the set of users identified by the information contained by the memory.

* * * * *